| United States Patent Office | 2,901,316 |
|---|---|
| | Patented Aug. 25, 1959 |

2,901,316

HYDRATED BISMUTH ALUMINATE

Jacques Rafael Roques, Paris, France, assignor to "Etablissements Roques" (Societe Anonyme), Paris, France, a corporation of France No Drawing. Application October 18, 1954
Serial No. 463,027

3 Claims. (Cl. 23—52)

This invention relates to medicaments and has particular reference to hydrated bismuth aluminate as an aluminum oxide and bismuth oxide product intended for treating digestive tract diseases, and also to a method of preparing this product.

It is known that—as a rule—medicaments utilized for fighting gastric diseases must produce a stomachal dressing when ulcers are present, and/or in certain cases an intestinal action. Most frequently, bismuth salts are used, chiefly carbonate and sub-nitrate. Alumina salts have also been proposed and this substance usually gives good results where bismuth is unsuccessful, and vice-versa. It was with a view to associate the activity of alumina with that of bismuth that the applicant thought of combining the oxides of these two substances in predetermined proportions and in a physical state also predetermined in view of deriving the maximal therapeutic action therefrom. Up to now, the use of hydrated aluminum oxide on the one hand and hydrated bismuth oxide on the other hand was chiefly confined to the use of freshly prepared products forming a suspension in a suitable liquid medium. Apparently, this is due to the fact that these products cannot lose the major portion of their hydration water without contracting and hardening, so that when ground they yield but a relatively dense powder scarcely adapted to spread over and cover the walls of the digestive system. Now, the applicant has discovered and developed a method whereby an intimate mixture having a predetermined composition may be prepared from hydrated aluminum oxide and hydrated bismuth oxide, this mixture being not contractible and enabling an extremely light powder to be produced which is characterized by an exceptional surface-covering powder.

The characteristic features of the method according to this invention are as follows:

The starting materials are pure sodium aluminate $Al_2O_3Na_2O$ in aqueous solution the aqueous solution thus containing the ions of sodium hydroxide, and bismuth nitrate $Bi(NO_3)_3$ in diluted nitric acid solution.

To obtain a mixture of the two solutions of the product which has at the same time the theoretical composition and the required physical properties, a few strict conditions must be adhered to. In the first place, the free NaOH alkalinity of sodium aluminate (i.e. the quantity of $Na_2O$ in excess of 1 mol. per 1 mol. of ($Al_2O_3$) should be such as to exactly neutralise the nitric acid of the solution, which is employed as a solvent for the crystallized bismuth nitrate.

If this condition is adhered to, the resulting product, when dried to a temperature lower than 140° F. (60° C.) behaves as if its formula were $Bi_2(Al_2O_4)_3.10H_2O$, after the equality:

$$3(Na_2O.Al_2O_3) + 2Bi(NO_3)_3 = Bi_2(Al_2O_4)_3 + 6NaNO_3$$

Consequently, we find exactly the percentages of $Al_2O_3$, $Bi_2O_3$ and $H_2O$ corresponding to this theoretical formula, i.e.: $Al_2O_3=32.2\%$; $Bi_2O_3=48.9\%$, and $H_2O=18.9\%$.

The other requirement to be observed in carrying out the method of this invention is that the precipitation of the product, which is effected by pouring the bismuth nitrate solution into the alumina solution, should take place at such temperature, concentration and rate that the hydrated alumina $Al_2O_3.3H_2O$ will assume immediately a microcrystalline state, which is an essential factor as far as the lightness of the product is concerned.

The most favorable temperature range is from 104° to 122° F. (40° to 50° C.). The precipitation must take place at a low rate and a long pause should be observed after one-half of the bismuth nitrate has been poured. A concentration of about 100 gr. of sodium aluminate for about 800 cc. of liquid must be observed. Stirring must be carried out preferably by using a high-speed turbo-agitator.

*Example*

50 gr. of sodium aluminate

$$\left(\text{molar ratio } \frac{Na_2O}{Al_2O_3}=1.18\right)$$

are dissolved in 400 gr. of water. To the solution heated to 113° F. (45° C.) in a mixer operating at 3,000 r.p.m. there is added a nitric solution of bismuth nitrate containing 40.70 gr. of $Bi_2O_3$, of which the free nitric acid is calculated to neutralise the free sodium from the sodium aluminate. This addition should take 20 minutes, including a 10-minute stop when one-half of the solution of bismuth nitrate has been poured. The final pH=8 to 8.5.

The product is then thoroughly washed by decanting it several times, and finally centrifugated or vacuum filtered. The drying is effected at 131° F. (55° C.).

After screening, 100 gr. of the product should occupy a volume of 500 cc. The composition of this product will correspond exactly to the theoretical formula $Bi_2(Al_2O_4)_3.10H_2O$.

The product is given to the patients orally.

What I claim as new is:

1. As a new composition of matter a hydrated bismuth aluminate corresponding to the formula $$Bi_2(Al_2O_4)_3.10H_2O$$

2. A method of producing the product of claim 1 comprising the step of slowly introducing a first solution consisting essentially of bismuth nitrate dissolved in dilute nitric acid, into a second solution consisting essentially of sodium aluminate dissolved in water and thus containing the ions of sodium hydroxide, the amount of nitric acid in said first solution being so chosen as to neutralize the free sodium hydroxide of said second solution so that the mixture of said first and second solutions will have a pH of approximately between 8 and 8.5, thereby forming a precipitate of hydrated bismuth aluminate.

3. A method according to claim 2 in which said mixture of said first and second solutions is formed at a temperature of approximately between 104° and 120° F.

References Cited in the file of this patent

UNITED STATES PATENTS

| 1,520,305 | Patrick | Dec. 23, 1924 |
| 2,413,184 | La Lande | Dec. 24, 1946 |
| 2,659,660 | Sable | Nov. 17, 1953 |

OTHER REFERENCES

Gooch: Outlines of Inorganic Chem., The McMillan Co., N.Y., 1905, part 2, pp. 84–91, 209–216.

Chemist and Druggist, vol. 152, Sept. 10, 1949, p. XXV (advt.).

U.S. Dispensatory, 24th ed., 1947, pp. 54–56.

Extra Pharmacopoeia, vol. I, 23rd ed., 1952, pp. 282, 283, 285.

Chem. Abst., vol. 41, 1947, p. 6102.